United States Patent
Spartz et al.

(10) Patent No.: US 12,253,462 B2
(45) Date of Patent: Mar. 18, 2025

(54) MONITORING GAS IMPURITIES WITH TOTAL SULFUR DETECTION

(71) Applicant: MLS ACQ, Inc., East Windsor, CT (US)

(72) Inventors: Martin L. Spartz, Ellington, CT (US); Kelly Renee McPartland, West Hartford, CT (US); Anthony S. Bonanno, Ellington, CT (US); Adam R. Klempner, Gardner, MA (US)

(73) Assignee: MLS ACQ, Inc., East Windsor, CT (US)

( * ) Notice: Subject to any disclaimer, the term of this patent is extended or adjusted under 35 U.S.C. 154(b) by 185 days.

(21) Appl. No.: 18/082,629

(22) Filed: Dec. 16, 2022

(65) Prior Publication Data

US 2023/0194419 A1    Jun. 22, 2023

Related U.S. Application Data (60) Provisional application No. 63/290,416, filed on Dec. 16, 2021.

(51) Int. Cl.
*G01N 21/3504*  (2014.01)
*G01N 21/3577*  (2014.01)
*G01N 21/35*    (2014.01)

(52) U.S. Cl.
CPC ..... *G01N 21/3504* (2013.01); *G01N 21/3577* (2013.01); *G01N 2021/3545* (2013.01); *G01N 2021/3595* (2013.01)

(58) Field of Classification Search
CPC .......... G01N 21/3504; G01N 21/3577; G01N 2021/3545; G01N 2021/3595; G01N 21/031; G01N 21/0317; G01N 21/94; B01D 53/04; B01D 2253/102; B01D 2256/22

See application file for complete search history.

(56) References Cited

U.S. PATENT DOCUMENTS

| | | | |
|---|---|---|---|
| 5,544,208 A * | 8/1996 | Pao | G01N 30/62 376/253 |
| 9,606,088 B2 | 3/2017 | Spartz et al. | |
| 10,054,486 B2 | 8/2018 | Spartz et al. | |
| 10,408,746 B2 | 9/2019 | Spartz et al. | |
| 10,761,018 B2 | 9/2020 | Spartz et al. | |

* cited by examiner

*Primary Examiner* — Kiho Kim
(74) *Attorney, Agent, or Firm* — Michael Best & Friedrich LLP (57) ABSTRACT

A system and method for determining impurities in a beverage grade gas such as $CO_2$ or $N_2$ relies on FTIR gas analysis for measuring non-sulfur impurities as well as $SO_2$. $CO_2\%$ also can be determined. A multiplexer selects a sample gas from multiple gas samples. Conversion of reduced sulphur present in some impurities to $SO_2$ is conducted in an oxidizing furnace. Climate control and measurements of oxygen gas impurities also can be provided.

22 Claims, 6 Drawing Sheets

MONITORING GAS IMPURITIES WITH TOTAL SULFUR DETECTION

RELATED APPLICATIONS

This application claims the benefit under 35 USC 119(e) of U.S. Provisional Application No. 63/290,416, filed on Dec. 16, 2021, which is incorporated herein by reference in its entirety.

BACKGROUND OF THE INVENTION

Carbon dioxide ($CO_2$) is a colorless, odorless gas that can be used as an inert material, as pressurized gas, in "dry ice", liquid or supercritical fluid applications, and many other areas, such as, for instance, oil production and the chemical industry. In the food sector, $CO_2$ is a medium for decaffeination and a feedstock for obtaining carbonated beverages, providing effervescence to water, soft drinks, wine, beer and so forth. Applications in the beverage industry require $CO_2$ of a specified purity. It is important, therefore, to monitor the nature and levels of contaminants in the gas employed.

Some existing systems for analyzing impurities in $CO_2$ gas rely on gas chromatography (GC) with photoionization detection (PID) and/or flame ionization detection (FID). GC systems, however, can be slow, requiring several (e.g., 6-8) minutes between samples.

Other approaches rely on mass spectrometry (MS), a technique that is fast but can suffer from cross interferences and calibration issues. Continued maintenance often is required.

Specialized instrumentation geared toward detecting a particular contaminant (total sulfur, for instance) or a class of contaminants (e.g., aromatics) also have been developed. These approaches, however, provide limited information. A sensor designed to focus on aromatic compounds, for instance, may fail to signal the presence of acetaldehyde or nitrogen oxides ($NO_x$). In many cases, one or more additional devices are needed to analyze for other contaminants. Combining multiple instruments often results in complicated designs, cumbersome calibrations and extensive maintenance, increasing costs.

U.S. Pat. Nos. 10,408,746 B2 and 10,761,018 B2, both issued to Spartz et al. and incorporated herein in their entirety by this reference, describe approaches for determining impurities in a beverage grade gas such as $CO_2$ or $N_2$ by coupling FTIR analysis and UV fluorescence detection. Reduced sulfur present in some impurities is converted to $SO_2$ in a furnace.

SUMMARY OF THE INVENTION

The food and beverage industry continues to demand techniques for measuring a wide variety of impurities, often present at parts per million (ppm) or even parts per billion (ppb) levels in gases such as carbon dioxide or nitrogen. Streamlined and user-friendly systems are highly desirable as are fast, in-line techniques. Some applications also benefit from capabilities for determining the quality of the gas used, the total % $CO_2$ in a beverage quality bulk $CO_2$ gas, for instance. In many cases, analyzing multiple (two or more) streams, sourced from different points in a manufacturing process is of great interest. Also of interest is conducting such analyses with simplified protocols and instrumentation that can still provide comprehensive impurity information.

Generally, the invention relies on infrared absorption analysis such as Fourier transform infrared (FTIR) gas analysis to measure impurities, including sulfur-based impurities, in beverage grade gases (such as $CO_2$ and $N_2$, for example) or in other applications that place purity requirements on a gas.

In many of its aspects, the invention features a system that includes a FTIR analyzer provided with a detector sensitive over a wide electromagnetic energy range. In one embodiment, the detector (a deuterated triglycine sulfate (DTGS) detector, for instance) is responsive over the entire mid-IR spectral range (wavelengths of 2 to 20 microns).

The system also includes an oxidizer module for converting reduced sulfur present in a gas sample to $SO_2$. In specific implementations, the oxidizer includes a furnace that can be operated at a temperature sufficient to carry out the oxidation reaction(s), e.g., about 1,000° C.

Also present is a multiplexer (or selector) module, typically a device that selects one sample input from among different input samples and forwards the selected sample for analysis. In specific examples, the multiplexer is a multi-position valve that steps incrementally through continuous revolutions. Several channels (e.g., 4 to 10, or more) can be provided for selecting a specific gas sample feed, which is then analyzed. In one embodiment, the sample feeds directed to the multiplexer are derived from multiple points in a plant employing a beverage grade gas.

An optional oxygen module for low level oxygen contaminations is added in some cases. The system can further include a climate control arrangement for maintaining a stable temperature, a parameter particularly important when measuring very low impurity levels.

Thus, in one embodiment, a system for measuring impurities in a beverage grade gas includes: a multiplexer for selecting a gas sample from multiple gas samples; a spectrometer including a gas cell for detecting an absorbance spectrum of gas in the gas cell; an oxidizing furnace for converting reduced sulfur present in the gas sample to $SO_2$; an arrangement including a device for directing the gas sample to the spectrometer or to the oxidizing furnace; and a computer module for operating the multiplexer, the oxidizing furnace and/or the device for directing the gas to the spectrometer or to the oxidizing furnace.

In other aspects, the invention features a method for measuring impurities in beverage grade gas such as $CO_2$, for example. In the method, the impurities, including those that contain sulfur are detected by a FTIR analyzer. In many embodiments, reduced sulfur species are oxidized to produce $SO_2$.

Accordingly, in another embodiment, a method for analyzing a beverage grade gas comprises: (a) selecting a gas sample from multiple gas samples; (b) directing a first stream (or portion) of the gas sample to a gas cell; (c) measuring impurities present in the gas cell with a spectrometer, wherein the impurities include $SO_2$; (d) directing a second stream (or portion) of the gas sample to an oxidizing furnace; (e) converting reduced sulfur present in the second stream (or portion) to $SO_2$; (f) directing gas exiting the oxidizing furnace to the gas cell; (g) measuring a total $SO_2$ in the gas cell; and (h) repeating steps (a) through (g).

It was initially thought that eliminating the UV fluorescence analyzer described in U.S. Pat. Nos. 10,408,746 B2 and 10,761,018 B2 would present some disadvantages. Embodiments described herein address some of those concerns, resulting in a system and method that do not rely on UV fluorescence detection. Rather, all the normal contaminants (including non-sulfur as well as sulfur-containing compounds) specified by the International Society of Beverage Technologists (ISBT) are analyzed by FTIR spectrometry, using a single instrument, fitted with a single detector.

In the beverage as well as other industries, the tolerance for many impurities present in gas streams can be very low, in the range of parts per million (ppm) or even parts per billion (ppb). The system and method described herein can offer a sensitive assessment of trace amounts while providing simultaneous readings for multiple contaminants. Both organic (e.g., volatile organic compounds or VOCs) as well as inorganic impurities can be detected. Amounts of all the aromatics and aliphatics can be correctly summed up. Methane can be measured individually. Approaches described herein can detect and measure moisture, a critical contaminant that can be introduced during truck delivery. Levels of $SO_2$, total sulfur and total reduced sulfur also can be determined. In one example, $SO_2$, total sulfur content as well as total reduced sulfur (TRS) can be measured down into the 10 s of ppb range.

Importantly, the quality of the $CO_2$ gas, a quality that can be affected by the presence of nitrogen gas ($N_2$) or air, can be measured to report $CO_2$ percentages in the gas being sampled. In contrast to other existing approaches, practicing embodiments of the invention can provide $CO_2$ measurements at 100%+/−0.03%.

The equipment described herein has at least one and preferably several sample inputs, to handle, for example, truck delivery, bulk gas, purified bulk gas and/or other feeds. In some cases, input process gas streams from different points of a carbonation process or plant (e.g., delivery tanker, pre- or post-filtration and so forth), along with zero gas and validation gas are controlled automatically. If desired, the system and method described herein can be integrated into the plant design.

Practicing embodiments of the invention can offer fast measurement times, reduced calibration requirements, analysis of many compounds and the capacity to measure multiple species using a single technique, namely FTIR spectrometry. The system can offer a fully integrated impurity and $CO_2$% measurement system. In many cases, the response time can be down to 5 seconds. Typically, calibrations for the FTIR data are not needed. Implementations described herein do not require different spectroscopic techniques or equipment or even switching between different FTIR detectors, offering a significantly streamlined and user friendly approach.

Three to five times lower minimum detection limits (MDLs), an important feature for benzene which has the lowest MDL requirement of 20 ppbv (parts per billion by volume) can be reached. MDL or Method Detection Limit is defined by the Environmental Protection Agency (EPA) as the minimum concentration of a substance that can be measured and reported with 99% confidence that the analyte concentration is greater than zero; it is determined from analysis of a sample in a given matrix containing the analyte.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention generally relates to techniques for detecting gas impurities and is of particular interest in applications that require very high gas purity levels. In many of its aspects, the invention relates to detecting impurities, also referred to herein as "contaminants" in beverage grade gases, for instance contaminants encountered in carbon dioxide ($CO_2$) gas and/or nitrogen gas ($N_2$).

$CO_2$ purity, for example, often depends on the $CO_2$ manufacturing process, plant purification methods, storage, transportation, point of use conditions and so forth. For the food and beverage sectors, for example, $CO_2$ is obtained via combustion, fermentation, from ammonia and hydrogen production. Both the preparation and the supply chain, often complex, that ultimately deliver the $CO_2$ to users can introduce impurities in the $CO_2$. Some of the contaminants particularly important to bottlers include acetaldehyde, benzene, methanol, total sulfur content and total hydrocarbons. Guidelines regarding $CO_2$ quality and best practices have been formulated by the International Society of Beverage Technologists® (ISBT), a group including beverage and $CO_2$ producers, distributors, providers of analytical and other related services and equipment.

Examples of impurities that can be identified and quantified practicing aspects of the invention include but are not limited to: $SO_2$, $NH_3$, CO, NO, $NO_2$, $H_2O$, HCN, $CS_2$, methanol, acetaldehyde, methane, total hydrocarbons (methane, ethane, propane, pentane), benzene and total aromatic hydrocarbons and others. In some implementations, the $CO_2$% present in a $CO_2$ sample gas also is determined. Detection is performed by FTIR gas analysis, employing methods and equipment described below.

In specific embodiments, the invention features a system comprising several components, also referred to herein as "modules". Embodiments of the system and its operation are described with reference to FIGS. 1 through 5.

Figure 1:
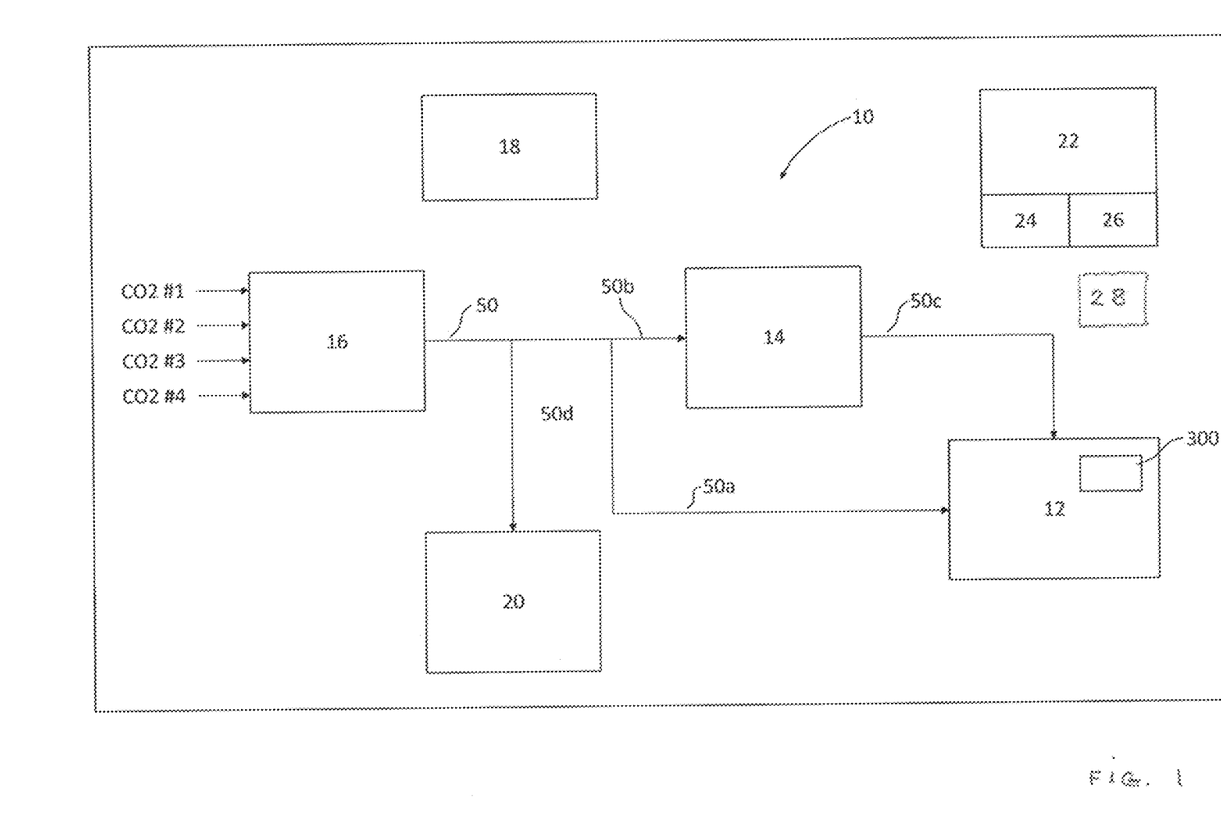
FIG. 1 is a block diagram presenting the components (modules) of a system designed to detect impurities in a gas.

As shown in the block diagram of FIG. 1, for example, system 10 includes: FTIR gas analyzer 12; oxidizer 14, typically including a furnace, for converting reduced sulfur to sulfur dioxide; multiplexer 16, having multiple, i.e., two or more (e.g., 4 to 10) channels; climate control module 18, used to maintain gas conditions suitable for accurate low-level measurements; and an optional oxygen module 20, for situations that may involve low levels of oxygen gas ($O_2$) contamination.

In specific embodiments, sample 50 is selected in multiplexer 16 from several input $CO_2$ samples, e.g., $CO_2$ feeds or streams #1 through #4 for a 4-channel multiplexer 16. In one implementation, these samples are derived from different beverage facility locations or process stages.

A first portion of sample 50, namely stream 50a, is directed to FTIR gas analyzer 12 for an assessment of impurities present in the sample, including $SO_2$. For measuring reduced sulfur, a second portion of sample 50, namely 50b is directed to oxidizer 14, where non-$SO_2$ sulfur-containing compounds are converted to $SO_2$. As a result, the oxidizer output 50c will contain the sum of the original $SO_2$ concentration present in the sample (already measured by the FTIR on stream 50a) and the $SO_2$ concentration generated from reduced sulfur in oxidizer 14. Accordingly, the FTIR $SO_2$ measurements on output stream 50c will reflect the total sulfur concentration in the sample 50. Reduced sulfur content can be determined by subtracting the $SO_2$ value in sample 50a from the $SO_2$ value in sample 50c.

For many applications, system 10 is under computer control illustrated by computer system 22, which can include additional elements such as, for instance, keyboard 24, touch screen 26, various connector, cables, electronic boards and/or panels, associated software, and so forth. Power module 28 supplies power (typically from an AC power source) to various components and/or their subcomponents.

In many cases, system 10 is designed to handle not only sample inputs (e.g., streams CO2#1 through CO2#4 in FIG. 1), but also other fluid streams such as purge or calibration gases. In illustrative examples, system 10 is designed to handle a sample gas, e.g., a sample $CO_2$ gas; a span or calibration gas (a gas containing known levels of impurities such as propane, benzene, COS, in $N_2$ gas) that can be diluted into a sample $CO_2$ to check the system calibration from time to time); an ultra-high purity (UHP) purge gas, e.g., UHP $N_2$ gas; an oxygen-containing gas, e.g., clean dry air (CDA) for conducting oxidation reaction in oxidizer 14, for example. System 10 also can employ an ultra-high purity (99.99+%) $CO_2$ gas, which serves to calibrate the system with respect to $CO_2$% determinations. In some implementations, this reference gas is supplied via multiplexer 16.

If needed or desired, suitable equipment can be included to further purify gas feed streams, to filter particulates from the sample gas, and so forth. For instance, a CDA purifier (e.g., a model obtained from Parker Hannifin Corp.) can be added for situations in which CDA (rather than $N_2$) is used as zero and purge for the FTIR instrument. A carbon filter or another suitable trap capable of removing contaminants present in the $CO_2$ sample gas can generate purified $CO_2$ gas, which then can be used as the reference $CO_2$, in the FTIR analyzer, for example.

The various gases are provided at specified conditions, from suitable sources, entering and exiting the system or modules thereof at various inlets and outlets. Within the system, fluid flow is directed through conduits (lines) that can be made of plastic or another suitable material.

Components and illustrative configurations of system 10 are further described with reference to FIGS. 2 through 5.

Figure 2:
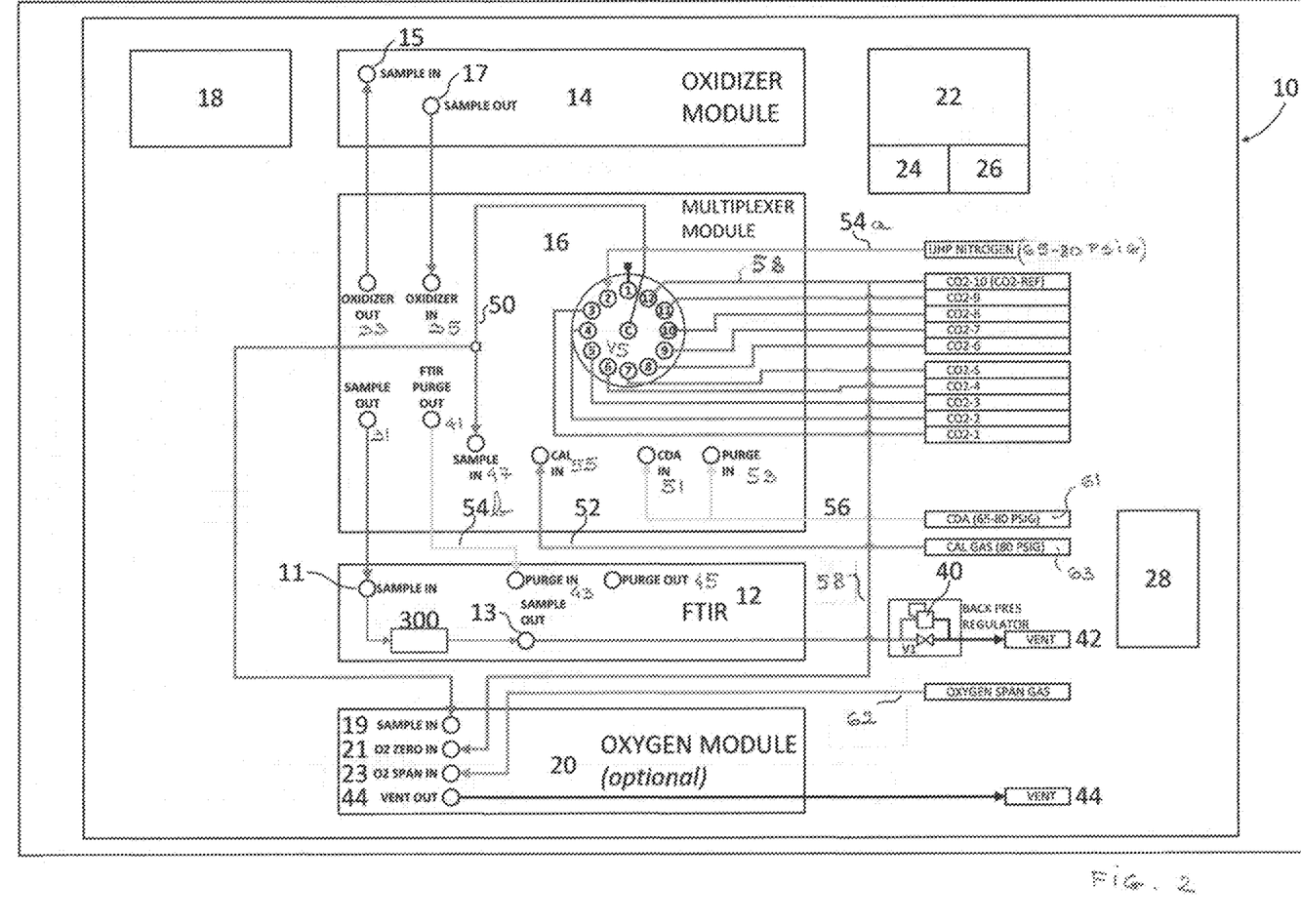
FIG. 2 is a diagram of a flow arrangement in a system that can be used to detect impurities, including sulfur-containing impurities, in beverage grade gases.

Shown in FIG. 2, for example, is one arrangement that can be employed to support the flow of gases not only in and out of the system but also from one component to another, with lines connecting inlets and outlets specific to a module and/or gas.

In the multiplexer 16, a sample stream, e.g., sample 50, is selected from various samples (streams $CO_2$-1 through $CO_2$-9) by a selector (multi-position) valve V5. Sample 50 enters the FTIR spectrometer at inlet 11 and exits the FTIR at outlet 13. Oxidizer 14 receives the sample stream 50 (which can be premixed with an oxidizing gas, such as CDA) at inlet 15, while the processed stream leaves the oxidizer 14 at outlet 17.

In more detail, sample 50 leaves multiplexer 16 at sample out 31, is directed toward the FTIR gas analyzer 12 and enters the FTIR module at sample inlet 11. Oxidizer outlet 33 references the $CO_2$ sample mixed with $O_2$ (CDA) leaving the multiplexer module 16 in the direction of the oxidizer module 14 (entering the oxidizer at inlet 15) to generate $SO_2$. Oxidizer inlet 35 indicates the processed sample coming back (from oxidizer outlet 17) to the multiplexer module 16, to be subsequently sent to the FTIR gas analyzer 12 for measurement.

$N_2$ gas 54a, at an illustrative pressure of in the range of from about 65 psig (~0.448 mega Pascal (MPa) or 79.7 psi absolute (psia), corresponding to ~0.550 mega Pascal) to 80 psig (~0.552 MPa) or 94.7 psia (0.653 MPa)) can be obtained from a suitable source, a gas bottle or cylinder, for instance. It is directed to valve V5 and from there it can be delivered to the gas cell 300 in the FTIR instrument (along the lines supporting sample flow), to purge all potential contaminants, e.g., atmospheric species such as $CO_2$, $CH_4$, CO, $H_2O$). $N_2$ gas also can be used to purge the optics in the FTIR instrument, as can CDA, in some cases. FIG. 2 shows the latter entering the multiplexer module at purge inlet 53; this same inlet can be used to introduce purge $N_2$ gas. In one example, $N_2$ purge gas that is used to purge the FTIR optics (stream 54b) leaves the multiplexer module 16 at FTIR purge out 41, enters the FTIR module at FTIR purge inlet 43 and exits the FTIR module at FTIR purge outlet 45. For purging the FTIR optics, $N_2$ gas can be derived from the same $N_2$ source as that providing stream 54a. However, the purge $N_2$ is not directed to V5 but rather towards purge inlet 53.

If present, the oxygen module receives the sample stream 50, the $O_2$ zero gas, typically high purity $CO_2$ gas 58 (obtained, for instance, via channel 12 of multiplexer 16), and $O_2$ span gas 62, at inlets 19, 21 and 23, respectively.

Other gas streams that can be employed include CDA gas 56, supplied from a suitable source 61 at a pressure of about 65 psig (0.448 MPa or 79.7 psia (~0.550 MPa)) to about 80 psig (~0.552 MPa or (94.7 psia (~0.653 MPa)), for example, and calibration (span) gas 52 (containing impurities such as propane, benzene, COS), supplied from source 63 at a pressure of about 80 to about 90 psig.

Port 47 is the sample in port from which sample can be delivered to the $O_2$ sensor (if present) and/or to a mass flow control (MFC 84 in FIGS. 3-5, for example) for delivery to the FTIR gas analyzer 12 or oxidizer module 14. CDA gas 56 can enter the multiplexer module at CDA inlet 51 and CDA purge gas at inlet 53 (for situations in which CDA (instead of $N_2$) is employed as a purge gas). Calibration gas 52 enters the multiplexer 16 at inlet 55.

Gases can exit the system via suitable vents. Vent 42, for example, can be used to exhaust gas from the FTIR gas analyzer 12. In specific implementations, FTIR 12 is provided with back pressure regulator 40 (for maintaining a defined pressure upstream of its location) and valve V1 (for bypassing back pressure regulator 40 and allowing gas to proceed to vent 42). If present, oxygen module 20 can be exhausted via vent 44. In specific implementations, the vents are configured with safety considerations in mind, to exhaust $CO_2$ to a safe location, away from the analyzer, for example.

Optionally, system 10 can include a sensory output 46 (FIGS. 3-5) for odor assessment by a qualified technician.

Figure 3:
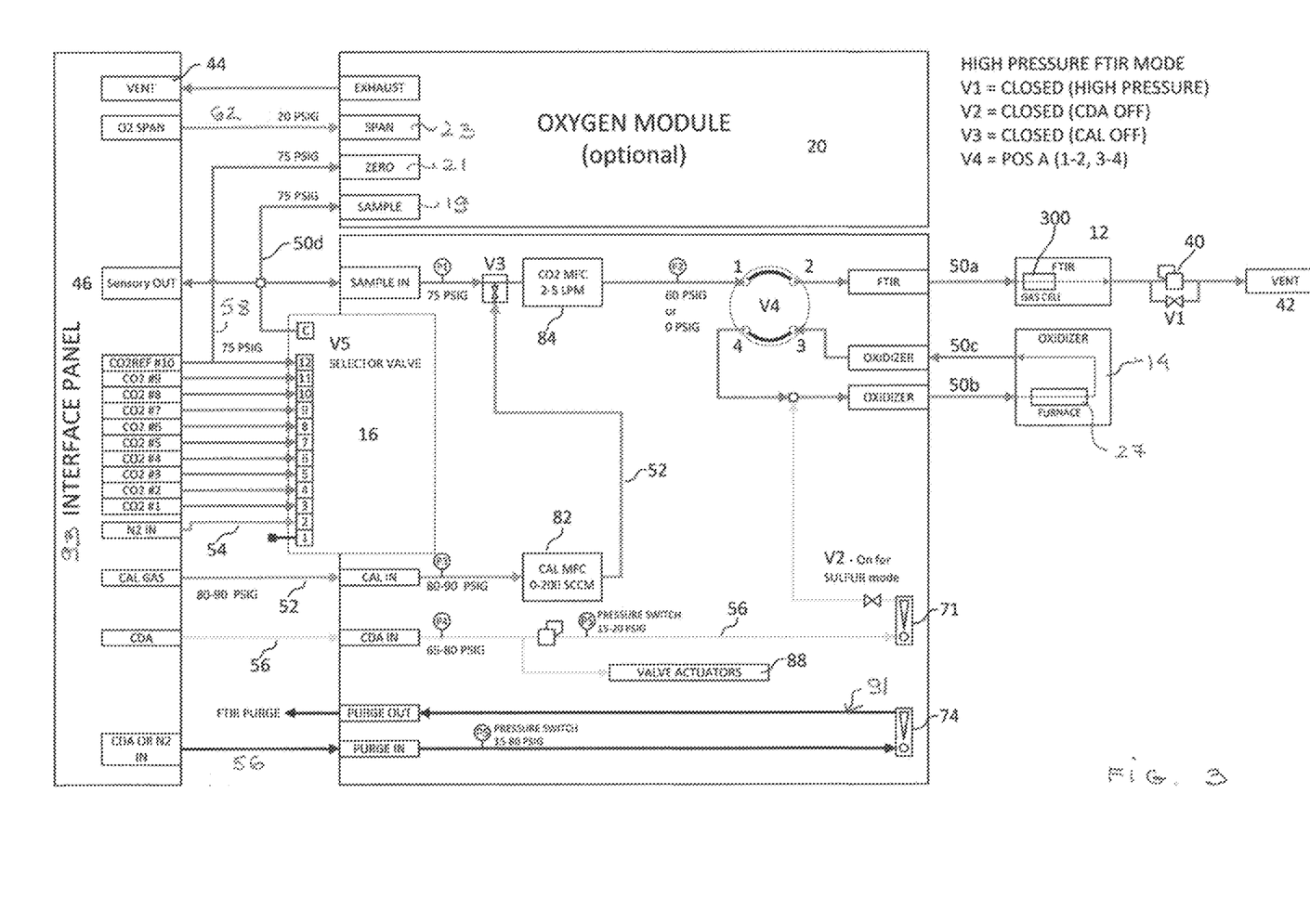
FIG. 3 is a diagram of a system in a high pressure FTIR mode.
Figure 4:
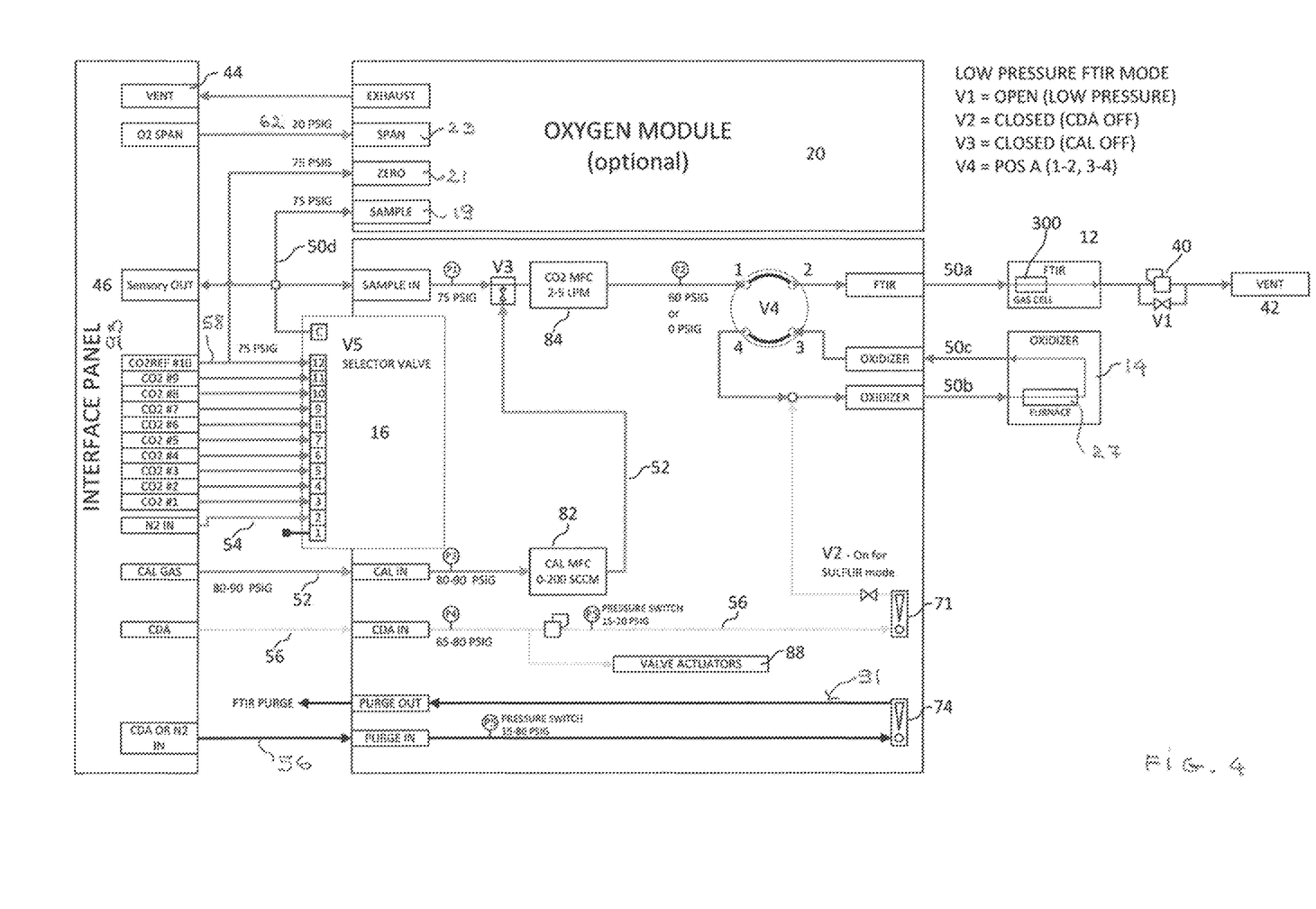
FIG. 4 is a diagram of a system in a low-pressure FTIR mode.
Figure 5:
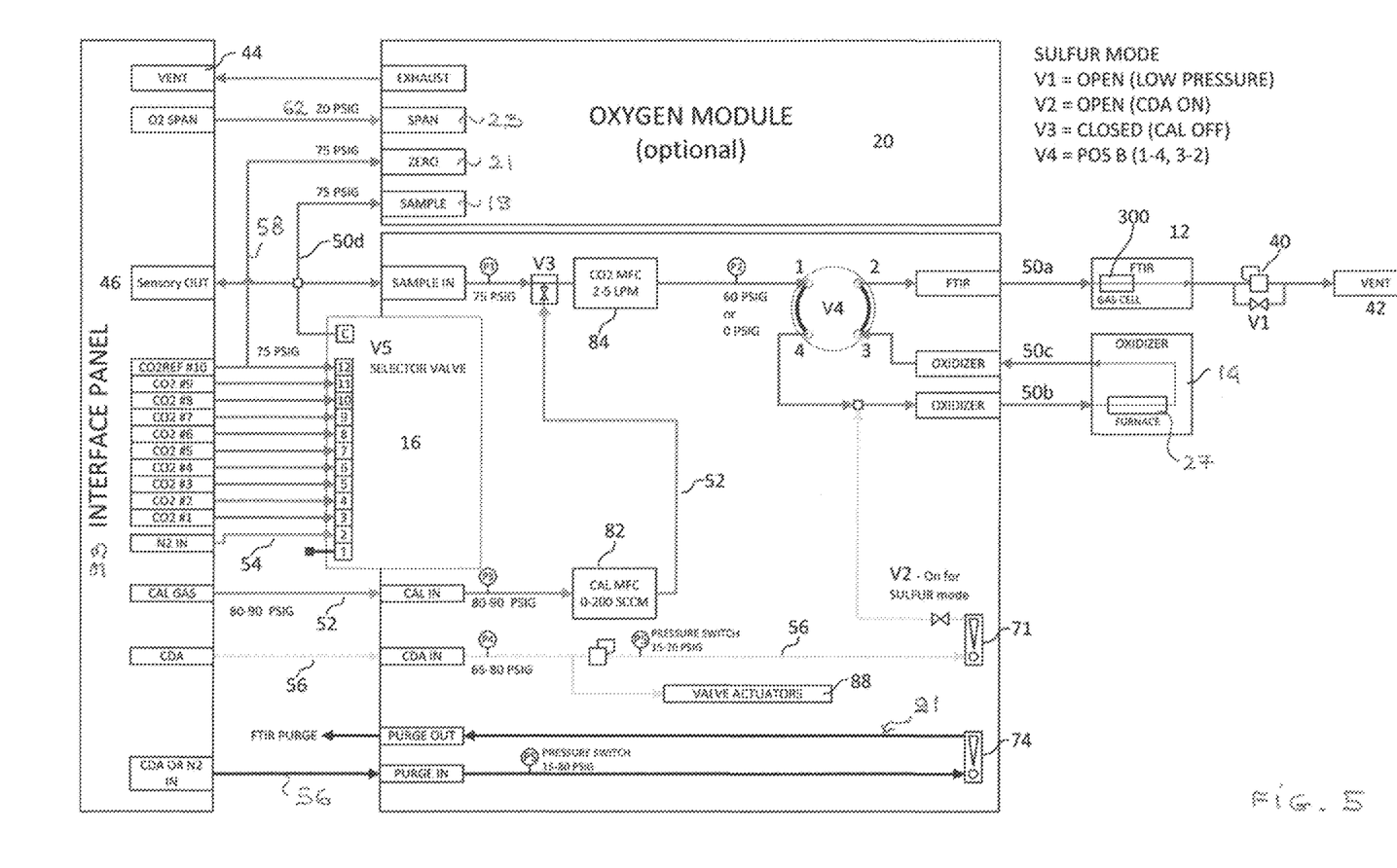
FIG. 5 of a diagram of a system in a sulfur mode.

Other devices for monitoring or controlling the flow of gases through system 10 are shown in FIGS. 3 through 5. Among them are span (calibration) mass flow controller (MFC) 82 and $CO_2$ main MFC 84. Pressure sensors P1, P2, P3, and P4 allow the incoming pressure regulators to be set to provide the correct pressures to the system and are monitored to ensure having the proper pressure at each point within the system. PS elements are switches used to confirm the pressure after a gas has moved through a pressure regulator and can alarm if a pressure is below a needed pressure value. Rotameters can be used in some cases.

In addition to the selector valve V5, system 10 can include various valves, such as V1, V2, V3, for blocking or allowing gas flow. In some embodiments, system 10 employs a rotating valve V4 (e.g., a VALCO, 2 position, 4 port, valve), further described below.

As shown in FIGS. 3 through 5, various gases enter or exit system 10 at interface panel 93. A sequence in which various gases are provided, and gas parameters relative to system components can be as follows.

As a first step, $N_2$ is passed through to zero the entire system. With only $N_2$ present, the pressure at the FTIR instrument can be at near 60 psig (~0.414 MPa or 74.7 psia (0.515 MPa)). This is followed by measuring the $CO_2$ high purity gas 58 ($CO_2$-ref, line 10 at valve V5), to set the calibration on the $CO_2$% reading. In some approaches, ultra-high purity $CO_2$ can be supplied in a separate cylinder of known-pure gas or can be the sample $CO_2$ that has been purified on-site (passed through carbon filters, for example).

A next step involves blending the span gas 52 into the $CO_2$-Ref gas (stream 58) to check the span on impurity gases like propane, benzene and reduced sulfur (COS). Other gases can be added to this mixture if desired or requested for a particular analysis. Corrections for the amount of compounds present can be made before or after injection of the calibration gas. Typically, the span gas is blended upstream of the main $CO_2$ MFC 84 to prevent oscillation in the span gas MFC 82 when switching from a high to a low downstream pressure. This results in a relatively constant pressure (about 75 psig (~0.517 MPa or 89.7 psia (0.618 MPa)) to about 80 psig (~0.552 MPa or 94.7 psia (0.653 MPa)) at the low pressure (output) side of the span MFC 82. In a typical operation, the pressure on the span MFC is normally 5 psig (~0.034 MPa or 19.7 psia (~0.136 MPa) to 10 psig (~0.069 MPa) or 24.7 psia (~0.170 MPa)) higher to prevent back flow. An arrangement in which V3 is opened (for adding gases) and closed (to prevent sample contamination from calibration gas 52 and to prevent it from bleeding out over time) allows the user to leave the calibration gas line pressurized. To prevent loss of calibration gas, the calibration gas can be turned on only when needing to perform this step.

To measure reduced sulfur, the back pressure regulator 40 is bypassed by opening V1 and the FTIR gas cell pressure is reduced such as to less than 2 atmospheres (atm) (less than ~0.203 MPa) or specifically, e.g., to 0 psig or 1 atm (~0.101 MPa). A sample spectrum is collected on the sample $CO_2$ at this point, to be used as an interference spectrum in the quantification for calculating the reduced sulfur as $SO_2$. The interference spectrum reflects the $SO_2$ initially present in the sample stream 50a as $SO_2$. The flows are then switched (by the rotating valve V4, and opening V2 as further described below) so that CDA is added to the sample $CO_2$ forming a stream 50b that is directed to oxidizer 14 for the conversion to $SO_2$. Processed stream 50c exits oxidizer 14 and is directed to the FTIR gas analyzer 12. Once the processed stream from the oxidizer has stabilized, an infrared spectrum is obtained to measure the $SO_2$ in stream 50c and, using the interference spectrum, determine the total reduced sulfur present.

Turning to a more detailed description of the modules included in system 10, FTIR gas analyzer 12 can be constructed using principles described in U.S. Pat. Nos. 9,606,088, and 10,054,486, to Spartz et al., both documents being incorporated herein in their entirety by this reference.

Typically, FTIR spectrometer 12 employs a "gas cell" 300 (also referred to herein as a "sample cell") made from a suitable material, for instance welded stainless steel. In one implementation the cell has welded stainless lines and the cell is aluminum with a nickel plating. The gas cell can be maintained at a desired temperature (e.g., room temperature or higher, about 35° C., for instance).

The FTIR spectrometer 12 has an interferometer such as a Michelson interferometer and a polychromatic infrared source. In a typical configuration, light from the source is collimated and directed to a beam splitter of the interferometer that divides the light between a fixed mirror in one arm and moving mirror in the other. The light from the arms is mixed back at the beam splitter and then directed to the sample cell and then to the detector. In a current configuration, both mirrors move to reduce the distance required to generate 4 cm-1 spectra. One is moving towards the beam splitter while the other is moving away. Then it turns around and goes in the opposite direction. This configuration also uses corner cubes as the interferometer mirrors instead of flat mirrors found in a traditional Michelson design.

In many embodiments, the gas cell is fabricated to withstand pressures above atmospheric. In specific examples, the cell is designed for pressures such as 2, 3, 4, 5 or higher atmospheres (atm). If designed as a flow-through gas cell it can support flow rates such as, for instance, 2 to 7 liters per minute or 2000 to 7000 sccm (standard cubic centimeter per minute) or higher. In fact, for the impurity measurement the flow rate is 7,000 sccm or even higher to speed up the turnover of the cell. A lower flow can be employed on the switch to low pressure, such as less than 3000 sccm, or, in one example, 1,725 sccm of $CO_2$ with 75 sccm of air for a total flow of 1,800 sccm. This ensures full conversion of the sulfur to $SO_2$ and also that the reactor is not cooled with cold gas. Often, the source pressure is considerably higher than the pressure in the gas cell and a pressure regulator can be included.

Increasing the pressure in gas cell 300 can improve sensitivity. Using high pressures of $CO_2$ is feasible since $CO_2$ does not absorb strongly in the IR spectral region in which the impurities of interest typically absorb. Thus, high amounts of $CO_2$ in the cell are not expected to interfere with the spectral features observed for the contaminants. Another gas that can be monitored for contamination is $N_2$. With no absorption in the region of interest, even higher (above 5 atm, for example) pressures of $N_2$ can be introduced in the cell, limited only by the materials and construction of the cell.

Typically, the gas cell windows are $BaF_2$ or $CaF_2$ and for many applications they too are designed to handle pressures higher than atmospheric, such as the pressures discussed above. Windows that are not water sensitive and do not have high refractive indices are preferred.

Some embodiments utilize a multiple reflection gas cell, such as, for instance, a White cell. Traditional White cells arrangements include three spherical concave mirrors having the same radius of curvature. Modified White cells or other multiple path designs, e.g., Herriott cells, Pfund cells, cavity-ring down cells, and integrating spheres, also can be employed, as described by Spartz et al. in U.S. Pat. Nos. 9,606,088 and 10,054,486. By increasing the path length traveled, multiple-pass arrangements can measure low concentration components or detect weak absorption spectral features without increasing the physical length or volume of the sample cell itself.

Longer path lengths can be used in combination with higher reflective coatings such as enhanced silver.

In one non-limiting example, the gas cell uses non-spherical concave mirrors to improve image quality and optical throughput. The mirrors are cut onto a single metal or a glass blank, providing a fixed path length; the mirrors can be the solid end caps of the gas cell, allowing for smaller sample cells that are easier to align. Such a "White" cell has a typical transmission of about 50%. Switching to enhanced silver mirrors can result in a transmission increase of up to 70% (meaning that about 40% more light will reach the detector for potentially 40% lower MDLs). For an exemplary White type cell with a volume of about 500 mL, using gold mirrors can produce a path length of about 9.86 meters (m), while enhanced silver mirrors can result in a path lengths of 10 m or longer.

A FTIR with a multiple pass White cell can have a large dynamic range. In one illustration, the dynamic range, namely the range from the limit of detection to the maximum signal that can be measured, is 1.0 ppb impurities to % $CO_2$ readings. The accuracy can be <+/−5% and the precision can be <+/−2% of reading. Typically, the linearity is better than 1%. In many cases, the $CO_2$ measurement are 100% +/−0.03%. The MDLs for impurities can range from 1 to 50 ppb, depending on the impurity. For instance, the MDL for reduced sulfur can be about 10 ppb.

For some applications, the sample cell can be a lightpipe flow-through sample cell.

The FTIR instrument can be provided with several options such as, for example: off or no flow; zero (using $N_2$ or high quality CDA); span mixture for calibration checking; and sample. The hardware, data collection, processing and reporting can be all handled together, e.g., using the MAX-Acquisition™ software package.

When the instrument is in the "off" sample selection, no gas enters the instrument. In the zero sample selection, purge gas (nitrogen or CDA, in some cases) sweeps through the gas cells. After purging the instrument (e.g., for 10-15 minutes) a new background can be taken, to obtain a clean reference single beam spectrum for comparison to new sample data. For the sample mode, purge gas is stopped and a current single beam measurement is obtained and compared to the reference single beam, generating an absorbance spectrum.

For specific applications such as measuring contaminants in a $CO_2$ gas sample, FTIR spectrometer 12 can be provided with calibrations for a large number of contaminant species. Others can be added as needed.

While in some cases all that is needed is measuring impurities, system 10 can also measure the concentration of $CO_2$ present in a $CO_2$ bulk or sample gas, typically expressed as $CO_2$%. This determination can be performed using $CO_2$ gas 58, which can be 99.999% pure, as a span gas to conduct a calibration operation. In the embodiments of FIGS. 2-5, the ultra-high purity $CO_2$ gas can be accessed by positioning valve V5 in fluid communication with the CO2-ref line. In one example, the calibration step is conducted by setting the flow rate of the main MFC 84 at 5 to 7 liter per minute (LPM) and the span MFC 82 to zero. Closing valve V3 prevents bleeding through the span MFC 82.

The spectrum of the ultrahigh purity $CO_2$ can then be compared with the collected spectra of the sample gas, the results indicating whether the sample gas is low quality, containing, for example, significant amounts of $N_2$ and/or $O_2$.

A high purity $CO_2$ calibration spectrum also can play a role in the impurity analysis. In one example, this high purity $CO_2$ spectrum resides on the computer, e.g., in a calibration database, and is utilized to remove the overlapping $CO_2$ spectral features while quantifying impurities. It was found that a calibration spectrum that matches closely the sample spectrum will address possible biases for compounds such as CO, $N_2O$, and/or benzene.

In some implementations, functionality is added to create an instrument validation stream internal to the instrument, to allow measurements of a known concentration of gases via the FTIR and thus ensure that the instrument is working properly.

FTIR spectrometer 12 can be, for instance, a MAX-iR FTIR Gas Analyzer, available from Max Analytical Technologies (East Windsor, Conn.), now a part of Thermo Fisher Scientific. Some illustrative features include: real-time gas analysis (1 sec-1 min response); 1-32 cm$^{-1}$ resolution FTIR spectrometer; VCSEL laser diode (long life); SiC IR source (long life); non-hygroscopic (no purge required); precision temperature and pressure sensors. The apparatus can be provided with a 5 U-19 inch standard rack; a 10 m high throughput multipass gas cell; and integrated analysis methods.

As already mentioned, some aspects of the invention relate to various features or techniques employed to circumvent the UV fluorescence measurements and apparatus taught in U.S. Pat. Nos. 10,408,746 B2 and 10,761,018 B2.

An important consideration to reach this goal is the selection of a FTIR detector that is sensitive over a broad IR frequency range. In specific examples, the detector is sensitive over a range covering spectral features associated with non-sulfur impurities such as acetaldehyde, aromatics, hydrocarbons, methanol, ammonia, etc., as well as the spectral features associated with sulfur dioxide ($SO_2$), in its typically IR region of 1,300-1,400 cm$^{-1}$. A deuterated triglycine sulfate (DTGS) detector, for example, allows for measurements in the entire mid-IR spectrum. DTGS detectors are thermal detectors for which the signal is generated in response to the change in temperature caused by absorption of the IR radiation. The response time of these detectors can be less than 1 millisecond (ms), allowing them to follow changes occurring at rates up to several kilohertz.

As noted in U.S. Pat. Nos. 10,408,746 and 10,761,018, DTGS detectors may present some disadvantages when compared with mercury cadmium telluride (HgCdTe or MCT) detectors. Nevertheless, it was discovered that, when integrated within system 10, DTGS detectors can measure the very low contaminant levels (including non-sulfur as well as $SO_2$ species), as required for analyzing beverage grade gases.

The FTIR instrument can be operated at 4 cm$^{-1}$ resolution at about 5 second data collection with Cosine Apodization. A rolling average of 1 to 5 minutes can be used with display updates at 5 to 6 second intervals. A lower resolution, such as 8 cm$^{-1}$ resolution, might provide somewhat better MDLs for some of the compounds of interest like benzene and the total aromatics. Using too low a resolution may result in losses in the capability of measuring some of the gases having narrow absorption bands. One illustrative example employs batch analysis. In this approach, measurements are obtained over a period of time, the data are averaged, and the results reported.

Configurations can be designed to obtain 1 ppb MDL for benzene. All other compounds can be detected with improvements of 100 to 1000 over the values required by the ISBT.

In practice, benzene often can be used as a surrogate for all aromatic impurities. Since all the aromatic impurities absorb in the same spectral region (3000-3200 cm$^{-1}$) and can be measured as a group by measuring just one, it is possible to quantify for benzene and report as benzene and total aromatic hydrocarbon content. Preferably, linear regression is used to determine the area under the spectral plot in this aromatic region. In general, these aromatic compounds produced about the same signal per mole.

Light VOCs such as methane, ethane, propane and pentane can be measured for the aliphatic hydrocarbons (most are in the 2750-3000 cm$^{-1}$ region). In some situations, the separation power of chromatography can be combined with the quantification power of absorption spectroscopy, as described, for example by U.S. Pat. Nos. 9,606,088 and 10,054,486. Such an approach can be particularly useful in detecting VOCs, for example.

Absorbance spectra can be analyzed via classical least squares (CLS) fitting to determine the level of contaminants present in the $CO_2$ stream. In typical implementations, both the background and the sample are analyzed at greater than 2 atm, and preferably greater than 3 or 4 atm and possibly 5 atm or higher to eliminate differences due to pressure. Preferably, calibrations for all contaminant gases are collected at the analysis conditions.

Techniques described herein can provide information on total sulfur impurities, sulfur dioxide ($SO_2$) as well as reduced sulfur. As noted above, FTIR 12 can register the presence of $SO_2$ directly. Obtaining data on non-$SO_2$ sulfur species (also referred to herein as "reduced" sulfur) relies on oxidizer (module) 14, which includes a furnace or another suitable apparatus for converting the reduced sulfur present in contaminants such as $H_2S$, $CH_3SH$, $CS_2$, COS (carbonyl sulfide), $(CH_3)_2S$, $(CH_3)_2S_2$, and/or other compounds, to $SO_2$.

The conversion (oxidation) reaction can be conducted using an oxidizing material such as oxygen, oxygen-enriched air or air, typically CDA. In one example, sample $CO_2$ is mixed with CDA (e.g., stream 56 in FIGS. 2-5) prior to entering oxidizer 14. One or both streams (i.e., CDA and/or the $CO_2$ gas sample) can be preheated to a suitable temperature, to facilitate the oxidation reaction. Another approach involves heating the stream resulting from the combination of the sample stream and CDA 56.

Suitable means for heating the desired gas or gases include heat exchangers, heating tape, heating jackets, ovens, Peltier heaters, cartridge heaters, and so forth. It is also possible to preheat a stream obtained by combining (mixing) CDA and $CO_2$. In many cases, the gas(es) entering the oxidizer will be at a temperature ranging from room temperature to a temperature that is equal to or lower than the temperature of the furnace.

To reduce the cost and complexity of the system, the air or $O_2$ addition can be controlled by a rotameter such as rotameter 71 in FIGS. 3-5. The total added flow (or sample dilution) can be monitored by measuring the change in the % $CO_2$. As a result, an accurate measured flow of air and $O_2$ is not required.

One example of an oxidizing apparatus that can be employed is described in U.S. Pat. Nos. 10,408,746 B2 and 10,761,018 B2. Such an apparatus includes a furnace where, in the presence of heat and an oxidizing gas, sulfur-containing compounds other than $SO_2$ yield $SO_2$. Typically, the $SO_2$ output from the furnace and, more generally from the oxidizer module 14, will include (i) $SO_2$ already present as such in the sample gas, and (ii) $SO_2$ generated through the conversion taking place in the furnace. As described in the '746 and '018 patents, oxidizer 14 can be provided with permeation devices, restrictors, and/or other elements. In some implementations, oxidizer 14 is a commercial apparatus or a unit thereof.

Oxidizer 14 can have three options: (1) zero, (2) span, and (3) sample, and can be controlled by its own independent software. The correct flow rates can be set via regulators that can be internal to the particular system used. Once thermally stable, the oxidizer is placed in the zero mode, where the sample $CO_2$ is scrubbed via a charcoal filter to remove contaminants and then analyzed. The instrument zero value is taken via an internal reference zero function.

Next, the instrument is placed into span mode, employing, for example, a span cylinder to introduce a known level of COS to the bulk $CO_2$. An internal auto span function can correct the calibration curve to the span response.

After these two calibration steps are conducted, the instrument is placed into sample mode where any sulfur species is converted to $SO_2$ and then reported via the FTIR spectrometer. Typically, the calibration and measurement steps are performed at less than 2 atm such as ambient pressure (1 atm).

One suitable protocol involves obtaining a FTIR spectrum of sample 50a at low pressure to get an interference spectrum of the sample. The flow is changed (at valve V4) so that sample 50b, with $O_2$ added (using CDA stream 56) is directed to furnace 27 of oxidizer 14. The processed stream exits as stream 50c and is analyzed in the FTIR instrument. The spectrum of gas 50a can be used in the analysis, so that the measured result would simply reflect the newly generated $SO_2$ (produced in the conversion), which represents the reduced sulfur gases.

Performing the measurements described above involves directing gases to: (a) oxidizer 14 and then to the FTIR instrument, or (b) just to the FTIR spectrometer 12, bypassing the oxidizer. In one arrangement, system 10 includes valve V4 (e.g., a VALCO, 2 position, 4 port, valve), which can be used in two configurations. MFC 84 can control gas delivery to V4 at a flow rate of, for instance, 2-5 liters per minute (LPM).

In configuration A (shown in FIGS. 2 and 3), ports 1 and 2 are in fluid communication with each other, as are ports 3 and 4. Configuration A can be used to direct sample gas (labeled, as stream 50a, typically at a pressure higher than atmospheric such as greater than 2 atm (~0.203 MPa), and preferably greater than 3 (~0.304 MPa) or 4 atm (~0.405 MPa) and possibly 5 atm (~0.507 MPa) or higher, such as 60 psig (~0.414 MPa or 74.7 psia (0.515 MPa)), for instance, to FTIR spectrometer 12. V4 can be rotated to configuration B (in which ports 1 and 4 are in fluid communication, as are ports 2 and 3. Configuration B, shown, for example, in FIG. 4, directs flow to furnace 27 of oxidizer 14 and allows processed gas exiting the oxidizer to enter the FTIR gas analyzer 12. In one implementation, as sample gas flows towards the oxidation chamber (e.g., furnace 27 in FIG. 4), a small amount of air or $O_2$ (e.g., CDA stream 56) is added (via rotameter 71) to the sample stream. Reduced sulfur present in stream 50b is converted to $SO_2$ and stream 50c (processed gas), typically at atmospheric pressure, leaves the oxidizer and is analyzed using FTIR spectrometer 12.

System 10 can be operated in several modes: a high pressure FTIR mode (illustrated in FIG. 3), a low pressure FTIR mode (illustrated in FIG. 4), and a sulfur mode (illustrated in FIG. 5.

Specifically, the high pressure FTIR mode (FIG. 3) involves V4 in configuration A, V1 in the closed (off) position so that gas cell 300 can be operated at pressures higher than atmospheric. V2 is closed (off), blocking CDA stream 56. Also closed (off) is V3, blocking the flow of calibration (span) gas 52. The FTIR data obtained in this mode reflects the $SO_2$ amounts initially present in the sample gas 50a.

For the low pressure FTIR mode of FIG. 4, V4 is in the A configuration (positions 1-2 and positions 3-4 in fluid communication), V1 is open, while V2 and V3 are closed. In this arrangement, pressure can be released by letting accumulated gas (e.g., sample 50a) from the sample cell 300 to proceed towards vent 42, reducing the back pressure in the sample cell to ambient pressure. The low pressure mode can be employed to prepare the FTIR gas analyzer 12 for conducting the reduced sulfur measurements at atmospheric pressure.

In the sulfur mode of FIG. 5, V4 is rotated to the B configuration with fluid communication for positions 1-4 and 2-3, allowing the sample stream access toward furnace 27 of oxidizer 14 and flow of the processed stream 50c from the oxidizer to FTIR 12. With V2 in the open position, CDA 56 is allowed to blend with the sample stream, forming stream 50b, directed to furnace 27. V3 is in the closed position, blocking the flow of calibration gas 52. This mode bypasses the FTIR spectrometer until after the sample gas has been processed in oxidizer 14. At that stage, the FTIR measurements on the output stream from oxidizer 14, namely stream 50c, are conducted in the low pressure FTIR mode (V1 is in the open position). As already noted, stream 50c reflects the total amount of sulfur as the sum of the $SO_2$ initially present in sample 50a and the $SO_2$ produced by the oxidation reactions taking place in oxidizer 14. If the FTIR spectrum of sample 50a is used as an interference spectrum, the FTIR analysis of the 50c stream can reflect the amount (concentration) of the reduced sulfur present in the sample.

In many embodiments of the invention, various gas feeds (streams) are introduced and analyzed, in a desired sequence, using multiplexer 16. This component (module) allows a gas sample to be selected for analysis from multiple (two or more) gas samples. The output data are generated by the FTIR instrument in a sequence corresponding to the sequence in which different gas samples are being introduced.

Two and preferably more than two (e.g., 4 to 10, in specific implementations) sample channels can be employed. Multiplexer 16 also can be used to introduce ultra-high purity $CO_2$ gas 58 (shown as $CO_2$ ref in FIGS. 2 through 5).

A valve arrangement opens or closes fluid communication for selectively allowing (or blocking) the flow of a specified gas. In one embodiment, multiplexer 16 employs a selector (multi-position) valve V5 (from Valco Instruments Co. Inc.). In FIGS. 2 through 5, V5 has 12 positions for introducing $N_2$, $CO_2$-ref #10 and samples $CO_2$ #1 through #9. Another implementation utilizes a 6-position Valco selector valve. Selector 16 of FIG. 1 has 4 inputs, specifically $CO_2$#1 through $CO_2$#4). Other arrangements can be employed to introduce gas feeds in a desired sequence.

To meet optimal conditions for obtaining the measurements described herein, system 10 is provided with climate control module 18 which involves sensors, regulators, and/or other means for controlling the physical properties of a gas stream passing through the system. For instance, in addition to measuring trace impurities, system 10 also can be used to determine percent $CO_2$ in a bulk or ultrapure $CO_2$ stream. A desired accuracy can be ±0.02% in a gas at near 100.0% $CO_2$. To calculate $CO_2$%±0.02% accuracy at near 100.0%, however, requires precise temperature and pressure, along with precise FTIR spectra.

In specific implementations, gas cell temperatures are maintained stable to ~0.03° C. This is found to involve measuring the actual gas temperature rather than simply the gas cell temperature. To meet this requirement, temperature sensors measure temperatures to ~0.03° C. and are configured and disposed to measure the temperature of the gas itself rather than that of the gas cell. Also preferred are sensors that can handle high pressures without leaking. Gas stream temperatures can be controlled using heat exchangers, heating tape, heating jackets, ovens, cooling chambers, Peltier heaters, cartridge heaters, and so forth.

In many cases, desired pressures need to be constant at 5.00 atm. In one example, the gas cell pressure is maintained at 5.00 atm≤±0.01 atm. Accordingly, preferred pressure gauges are designed for accurate and precise measurements to ±0.0005 atm at 5.00 atm. In some embodiments, a pressure sensor is installed on the gas cell to ensure that the exact pressure within the cell is known (not just the pressure on the gas line going into and out of the cell).

Figure 6:
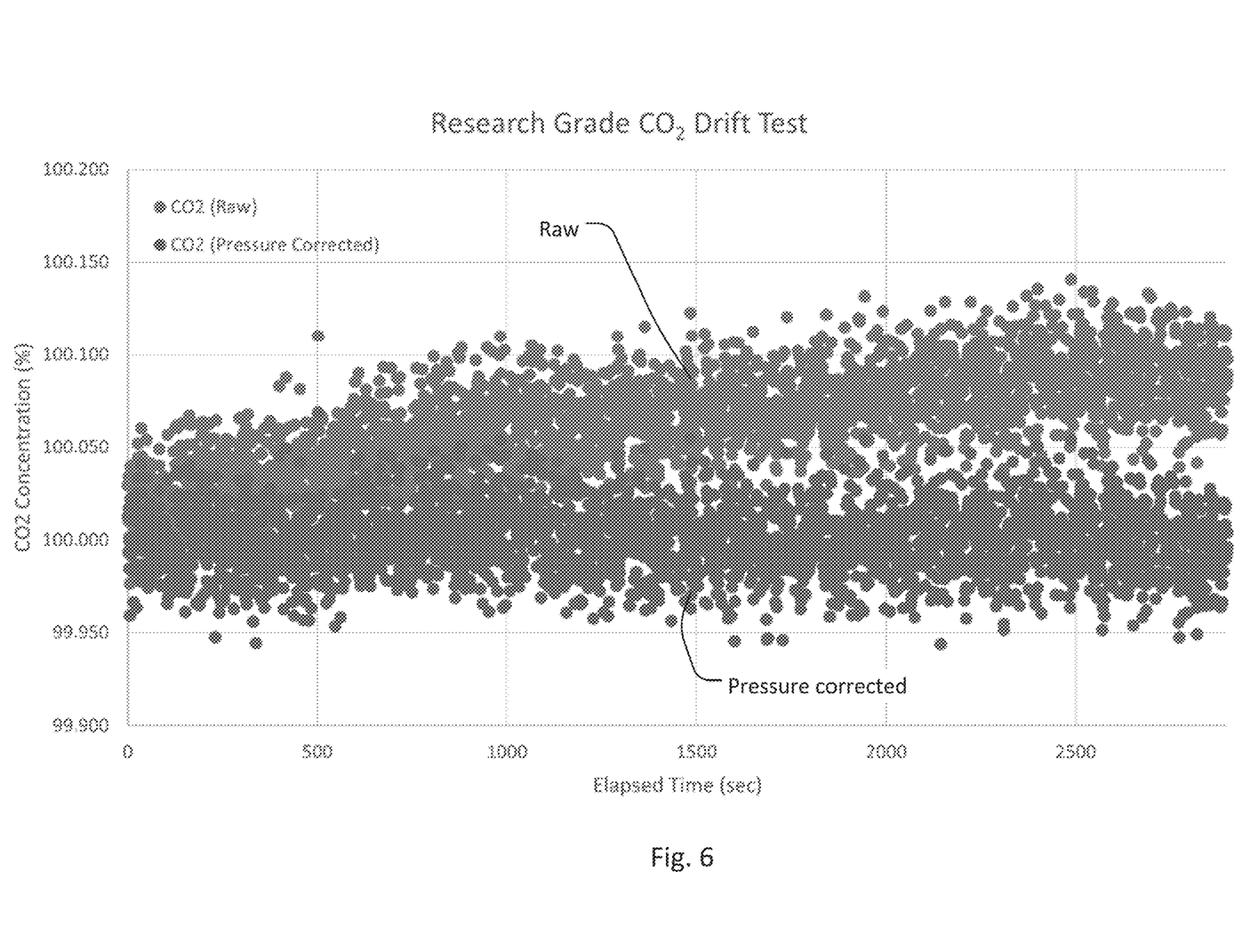
FIG. 6 is a plot showing research grade $CO_2$ drift test data obtained in developing a correction parameter for a back pressure regulator.

Another approach compensates for pressure drifts, such as might be encountered in a back pressure regulator (e.g., pressure regulator 40), by using a correction of the $CO_2$ reading. To illustrate, a Swagelok back pressure regulator that has some drift at a pressure of 5 atm is modeled and the data are corrected for any change in pressure from the reference 5.00 atm. A pressure correction equation was developed using research grade $CO_2$ drift data, which were collected in a well-controlled environment. The data are shown in FIG. 6. A linear regression was developed to model the variance in the $CO_2$ concentration from 100.000% ($\Delta CO_2$) as a function of the variance in measured pressure from 5 atm ($\Delta P$). From this linear regression, the pressure correction equation was derived to report an adjusted (corrected) $CO_2$ concentration. An equation that can be used is:

$$CO_2 \text{ corrected} = (\text{Measured } CO_2 + (15,500 \times (5.00 - \text{Measured pressure})))^* CF$$

where CF is a correction factor specific to each instrument for correcting for small errors in the temperature and pressure readings.

System 10 can include optional oxygen module 20, useful for determining oxygen levels in a sample $CO_2$ gas. If present, oxygen module 20 employs a detector or analyzer that relies, for example, on one or more oxygen sensors, such as: electrochemical oxygen sensors, zirconia oxygen sensors, optical oxygen sensors, Clark oxygen sensors, infrared oxygen sensors, electro galvanic sensors, ultrasonic oxygen sensors, and laser oxygen sensors. In one illustration, the gas sensor is designed to measure oxygen levels at the parts per million or parts per billion level. Many sensors can be further configured to provide a feedback mechanism for controlling the oxygen level in the gas stream. In many of the embodiments described herein, $O_2$ levels are determined by a sensor or sensors that operate independently of FTIR spectrometer 12.

As discussed with reference to FIG. 2, oxygen analyzer 20 can have a zero mode (performing measurements on gas stream 58, a high purity $CO_2$ gas that can be supplied, for instance, via multiplexer 16), a span mode (using oxygen span gas 62) and a sample mode using, for instance any of the samples $CO_2$#1 through #9 selected via multiplexer 16. In FIGS. 3 through 5, the sample gas is labeled 50d. In specific implementations, the span gas is run at a single level; it is not diluted with $CO_2$ for any gas delivered from the multiplexer.

Illustrative pressures can be 20 psig (~0.138 MPa or 34.7 psia (~0239 MPa)) for the $O_2$ span gas, 75 psig (~0.517 MPa or 89.7 psia (0.618 MPa)) for the zero calibration gas and 75 psig (~0.517 MPa or 89.7 psia (0.618 MPa)) for the sample gas. The gas contents are exhausted from optional oxygen module 20 at vent 44.

Gas inputs, flows, calibrations, sample analysis and/or other operations can be automated, as can be switching between the various channels, pressures, flow pathways and so forth. Pressure controls and valves that can rely on actuators (e.g., actuators 88 in FIGS. 3-5) as well as other components of system 10 can be controlled by a controller, computer system 22, for instance.

In many embodiments, functions performed by climate control module 18 or components thereof are automated. In one illustration, climate control module 18 includes two Peltier heating/cooling systems, the temperature set points for each being controlled by computer system 22.

Other features that can be provided include touch screen technology, programmable logic controllers (PLC), remote pressure and/or mass flow controllers (MFC) to control one or more gas streams, multiple (e.g., 4 or more), automated sample channels, to name a few. Ethernet, Modbus and/or other means can be used for data communication and remote control. Further implementations utilize wireless communications, based, for instance, on existing or developing technologies.

Several or all functions can be centralized. In one implementation system 10 employs MAX-Acquisition™ to control and report everything.

Other information can be provided via Modbus or another suitable protocol. Some implementations allow users to identify maximum allowable concentrations for all gases, warning percentages for a list of gases, and the amount of time to average data. For instance, after pulling in and averaging results, concentrations of contaminants are displayed in a desired format. In one example, a graphical representation of the data is shown via a bar chart on the right. Both the concentration and its corresponding bar can change between green, yellow, and red, for instance, based upon the user settings for maximum concentrations and warning percentages.

Conducting a desired gas analysis relies on operating the various components, along with the appropriate hardware and software algorithms. Setting the various functional states to obtain each measurement is further described in the illustrative example below.

EXAMPLE

This example presents a protocol that can be implemented on system 10 as described with reference to FIGS. 1-5.

As a first step, a purge gas, e.g., ultra high purity (UHP) nitrogen gas such as stream 54a in FIG. 2, typically having a nitrogen gas concentration of 99.999% with negligible impurities) is provided (via multiplexer 16, for example) and directed to FTIR spectrometer 12 to collect a background spectrum. The purge flow pathway 91 (FIGS. 3-5), can include a pressure switch PS (15 to 80 psig (0.103 to ~0.552 MPa) or 29.7-94.7 psia (~0.205 to ~0.653 MPa) and rotameter 74 and typically supports $N_2$ purging. In some cases, the purge gas can be CDA (gas 56 in FIGS. 3-5), however.

$CO_2$ gas 58 (provided, for instance as $CO_2$-ref from channel 12 of multiplexer 16) is ultra-pure and can be utilized to obtain a baseline FTIR spectrum. In specific examples, the reference $CO_2$ in the FTIR sample cell 300 is maintained at a pressure higher than atmospheric, e.g., a pressure that is the same or close to the pressure of the sample $CO_2$ in the gas cell 300, e.g., about 5 atm. IR features of the reference $CO_2$ can be subtracted from the IR features of the sample $CO_2$, resulting in spectral features that can be used to identify impurities in the sample of interest.

If the reference $CO_2$ has water, the spectral signatures of this interference can be subtracted from the reference spectra for the pure $CO_2$. Care to avoid negative concentrations is highly recommended. Specifically, the reference spectrum is reviewed for any positive biases.

Alternatively, or additionally, calibrations for high purity $CO_2$ can be resident on the computer system 22 or accessible to it. For instance, $CO_2$ calibration spectra can be available in a database.

Sample $CO_2$ can originate from one of several (i.e., two or more) locations from a facility or plant. In one example, $CO_2$ samples are provided from 4 or more locations at a plant handling beverage grade $CO_2$. The selected sample gas feed 50 (flowing directly from one of the channels in multiplexer 16) is introduced to the FTIR instrument as stream 50a, to obtain the impurity and the % $CO_2$ measurements. Typically, these measurements are performed at a temperature above room temperature, 35° C. in many cases, and above atmospheric pressures (5.0 atm, for example). Pressures above atmospheric are found to decrease detection limits. Pressurizing the analysis (gas) cell to 5.0 atm, for instance, can result in minimum detection limits (MDL) in the low ppb range for contaminant gases such as, for instance, CO, $NO_x$, benzene, acetaldehyde, acetone and $SO_2$. This pressure can be controlled by back pressure regulator 40, which can be set prior to the collection of the background or sample gas.

As a functional consideration, when the system is switched from $N_2$ to $CO_2$, the pressure is preferably modulated between 1 and 5 atm two or more times, for 5 cycles, for example, with $CO_2$ flowing to the gas cell 300 to remove trace $N_2$ from the gas cell (dead legs and trapped $N_2$). This is performed so that the % $CO_2$ reading is not affected. (The converse is also true: if a new $N_2$ background is required, $N_2$ at high and low pressure is introduced to clear any residual $CO_2$).

After the measurements on sample gas 50a are performed, the FTIR gas cell pressure is reduced by opening valve V1 (which bypasses the back pressure device 40), so that total sulfur measurements can be made at ~1.0 atm. Equilibration of $CO_2$ at 1 atm can take a minute or less, 30 seconds, for example.

Once the pressure is stable, an infrared spectrum is collected to zero out all interferences ($CO_2$, water other gases present in the bulk) to the $SO_2$ generated from the oxidizer 14. This step can take 1 minute or less, e.g., 30 seconds for instance.

After the interference spectrum is collected, V4 is rotated to send the sample gas, e.g., bulk $CO_2$ (or other bulk gas) to the ~1,000° C. oxidizer. As the sample gas flows towards the oxidation chamber a small amount of air or $O_2$ (e.g., CDA 56) is added to the stream (using device 71, e.g., a rotameter) to allow for the oxidation of reduced sulfur to $SO_2$. The resulting stream, 50b, is processed to convert non-$SO_2$ sulfur-containing species to $SO_2$, to produce stream 50c.

Switching valve V4 to sulfur mode allows for FTIR measurements of the $SO_2$ present in the gas stream 50c. Total reduced sulfur can be obtained by subtracting the measurement of the $SO_2$ initially present in the sample gas as $SO_2$ (as measured directly by the FTIR on sample stream 50a) from the measurements obtained on the gas exiting the oxidizer (stream 50c). In one illustration, the $SO_2$ analysis requires a minute or so.

To start the next measurement the process is conducted in reverse. The air or $O_2$ source is turned off at valve V2. V4 is returned to its initial position, V1 is closed, and the sample is switched to the next channel on multiplexer 16.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for analyzing a beverage grade gas, the system comprising:
   a multiplexer for selecting a gas sample from multiple gas samples;
   a spectrometer including a gas cell for detecting an absorbance spectrum of gas in the gas cell;
   an oxidizing furnace for converting reduced sulfur present in the gas sample to $SO_2$;
   an arrangement including a device for directing the gas sample to the spectrometer or to the oxidizing furnace; and
   a computer module for operating the multiplexer, the oxidizing furnace and/or the device for directing the gas to the spectrometer or to the oxidizing furnace;
   wherein the computer module is configured to operate the device for directing the gas to the spectrometer to switch conditions in the gas cell between an atmospheric pressure and a pressure above atmospheric.

2. The system of claim 1, wherein the gas cell is a multiple path type cell and/or wherein the gas cell is configured for pressures higher than atmospheric.

3. The system of claim 1, wherein the spectrometer is provided with a FTIR detector for measuring $SO_2$ and non-sulfur impurities in the sample gas.

4. The system of claim 1, further comprising conduits, valves, an oxygen analyzer, and/or controls for pressure, temperature and/or flow rates.

5. The system of claim 1, wherein the system does not include a UV fluorescence apparatus.

6. The system of claim 1, wherein the multiplexer is configured to receive gas feeds from multiple plant locations.

7. The system of claim 1, wherein the computer module further comprises one or more functions for collecting, analyzing and/or reporting data from the spectrometer.

8. The system of claim 1, wherein the computer module comprises connections to one or more of the multiplexer, the spectrometer and the oxidizing furnace and/or is configured for local area network communications.

9. The system of claim 1, further comprising software for collecting, analyzing and/or reporting data.

10. The system of claim 1, further comprising calibration information for pure $CO_2$ and/or one or more impurity for the spectrometer.

11. A method for analyzing a beverage grade gas, the method comprising:
   (a) selecting a gas sample from multiple gas samples;
   (b) directing a first portion of the gas sample to a gas cell;
   (c) measuring impurities present in the gas cell with a spectrometer, wherein the impurities include SO2;
   (d) directing a second portion of the gas sample to an oxidizing furnace;
   (e) converting reduced sulfur present in the second portion to SO2;
   (f) directing gas exiting the oxidizing furnace to the gas cell;
   (g) measuring a total SO2 in the gas cell;
   (h) repeating steps (a) through (g); and
   (i) switching conditions in the gas cell between an atmospheric pressure and a pressure above atmospheric.

12. The method of claim 11, wherein step (c) is conducted at a pressure higher than atmospheric and/or wherein step (g) is conducted at atmospheric pressure.

13. The method of claim 11, wherein total $SO_2$ measured in the second portion of the gas sample is compared with $SO_2$ measured by the spectrometer in the first portion of the gas sample to determine a TRS amount.

14. The method of claim 13, further comprising controlling gas pressure and/or gas temperature in the gas sample cell and/or purging the sample gas cell after step (c).

15. The method of claim 11, wherein data obtained for impurities in the first portion of the gas sample are compared with calibration data.

16. The method of claim 11, wherein the impurities are selected from the group consisting of $SO_2$, total sulfur, $NH_3$, CO, NO, $NO_2$, $H_2O$, hydrogen cyanide (HCN), $CS_2$, methanol, acetaldehyde, methane, total hydrocarbons, benzene and total aromatic hydrocarbons and the beverage grade gas is $CO_2$ or $N_2$.

17. The method of claim 11, wherein the gas sample is selected from multiple gas samples, obtained from different locations in a plant, by a multiplexer.

18. The method of claim 11, further comprising measuring oxygen gas present in the sample gas.

19. The method of claim 11, wherein a $CO_2$ % in the first portion of the gas sample is determined by the spectrometer and compared to calibration information.

20. The method of claim 11, further comprising controlling at least one of steps (a) through (h) automatically.

21. The method of claim 11, wherein the method does not include detecting $SO_2$ by UV fluorescence.

22. A system, comprising:
- a spectrometer including a gas cell for detecting an absorbance spectrum of gas in the gas cell;
- an oxidizing furnace for converting reduced sulfur present in the gas to $SO_2$;
- an arrangement including a device for directing the gas to the gas spectrometer; and
- a computer module configured to operate the device for directing the gas to the spectrometer to switch conditions in the gas cell between an atmospheric pressure and a pressure above atmospheric.

* * * * *